United States Patent
Tek et al.

(10) Patent No.: US 7,620,501 B2
(45) Date of Patent: Nov. 17, 2009

(54) ARTERY-VEIN SEPARATION AND VESSEL MODELING

(75) Inventors: Huseyin Tek, Princeton, NJ (US); James P. Williams, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 441 days.

(21) Appl. No.: 11/120,875

(22) Filed: May 3, 2005

(65) Prior Publication Data

US 2005/0249399 A1 Nov. 10, 2005

Related U.S. Application Data

(60) Provisional application No. 60/568,495, filed on May 6, 2004.

(51) Int. Cl.
*G06F 19/00* (2006.01)
*G01B 15/04* (2006.01)
*G01B 5/20* (2006.01)
*G06K 9/00* (2006.01)

(52) U.S. Cl. .................. 702/19; 702/155; 702/167; 382/130; 382/131; 382/164

(58) Field of Classification Search .............. None
See application file for complete search history.

(56) References Cited

U.S. PATENT DOCUMENTS 7,015,907 B2 * 3/2006 Tek et al. .................. 345/423

OTHER PUBLICATIONS

McInerney et al. (Medical Image Analysis (1996) vol. 1, pp. 91-108).*
Nain et al. (MICCAI 2004, LNCS 3216, pp. 51-59 (2004).*
Wong et al. (MICCAI 2004, LNCS 3217, pp. 602-609 (2004).*
Young et al. MICCAI (2001), LNCS 2208, pp. 491-498, Springer-Verlag, Berlin, W. Neissen et al., Eds.*
McInerney et al. IEEE Transactions on Medical Imaging (1999), vol. 18, No. 10, pp. 840-850.*

* cited by examiner

*Primary Examiner*—Lori A. Clow

(57) ABSTRACT

A system and method for artery-vein separation and vessel modeling are provided, the system including an adapter unit, a centerline locating unit in signal communication with the adapter unit, and a deformable modeling unit in signal communication with the centerline locating unit; and the method including receiving three-dimensional image data indicative of vessels, visualizing the received image data, selecting seed points on the vessels relative to the visualization, smoothing the image data with a non-linear filter responsive to curvature information of the data, initiating a deformable model for each selected seed point, modulating the propagation of each deformable model in accordance with at least one of local and global statistics, and growing an interconnected region for each model, where each model competes for classifying new points in its own region until convergence.

30 Claims, 6 Drawing Sheets

ARTERY-VEIN SEPARATION AND VESSEL MODELING

CROSS-REFERENCE TO RELATED APPLICATION

This application claims the benefit of U.S. Provisional Application Ser. No. 60/568,495, filed May 6, 2004 and entitled "Artery-Vein Separation for Vessel Modeling", which is incorporated herein by reference in its entirety.

BACKGROUND

Accurate maps of arterial structures are typically required for clinical analysis and surgical support. In modern medical imaging techniques, blood vessels, including both arteries and veins, may be significantly enhanced in the imaging data when contrast agents are used. Unfortunately, arterial structures in the imaging data typically need to be manually segmented and/or separated from venous structures for better visualization and quantification.

Thus, what is desired is a way to accurately segment and separate arterial structures from venous structures in the imaging data while minimizing manual intervention. The present disclosure addresses these and other issues, including a system and method for artery-vein separation and vessel modeling.

SUMMARY

These and other drawbacks and disadvantages of the prior art are addressed by a system and method for artery-vein separation and vessel modeling.

An exemplary system for artery-vein separation and vessel modeling includes an adapter unit for receiving three-dimensional image data, a centerline locating unit in signal communication with the adapter unit for visualizing the received image data, selecting seed points on the vessels relative to the visualization, and smoothing the image data with a non-linear filter responsive to curvature information of the data, and a deformable modeling unit in signal communication with the centerline locating unit for initiating a deformable model for each selected seed point, modulating the propagation of each deformable model in accordance with at least one of local and global statistics, and growing an interconnected region for each model, where each model competes for classifying new points in its own region until convergence.

A corresponding exemplary method for artery-vein separation and vessel modeling includes receiving three-dimensional image data indicative of vessels, visualizing the received image data, selecting seed points on the vessels relative to the visualization, smoothing the image data with a non-linear filter responsive to curvature information of the data, initiating a deformable model for each selected seed point, modulating the propagation of each deformable model in accordance with at least one of local and global statistics, and growing an interconnected region for each model, where each model competes for classifying new points in its own region until convergence.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for artery-vein separation and vessel modeling in accordance with the following exemplary figures, in which.

DETAILED DESCRIPTION OF PREFERRED EMBODIMENTS

In medical imaging techniques, blood vessels, including both arteries and veins, may be enhanced in the imaging data when contrast agents are used. For example, both arteries and veins may be significantly enhanced in Magnetic Resonance Angiography ("MRA") data when the MS-325 contrast agent is used.

Embodiments of the present disclosure accurately segment and separate arterial structures from venous structures in imaging data for better visualization and quantification. An exemplary embodiment algorithm combines region-based deformable models with vessel centerline models for the separation of arteries from veins in Contrast-Enhanced ("CE") MRA.

Figure 1:
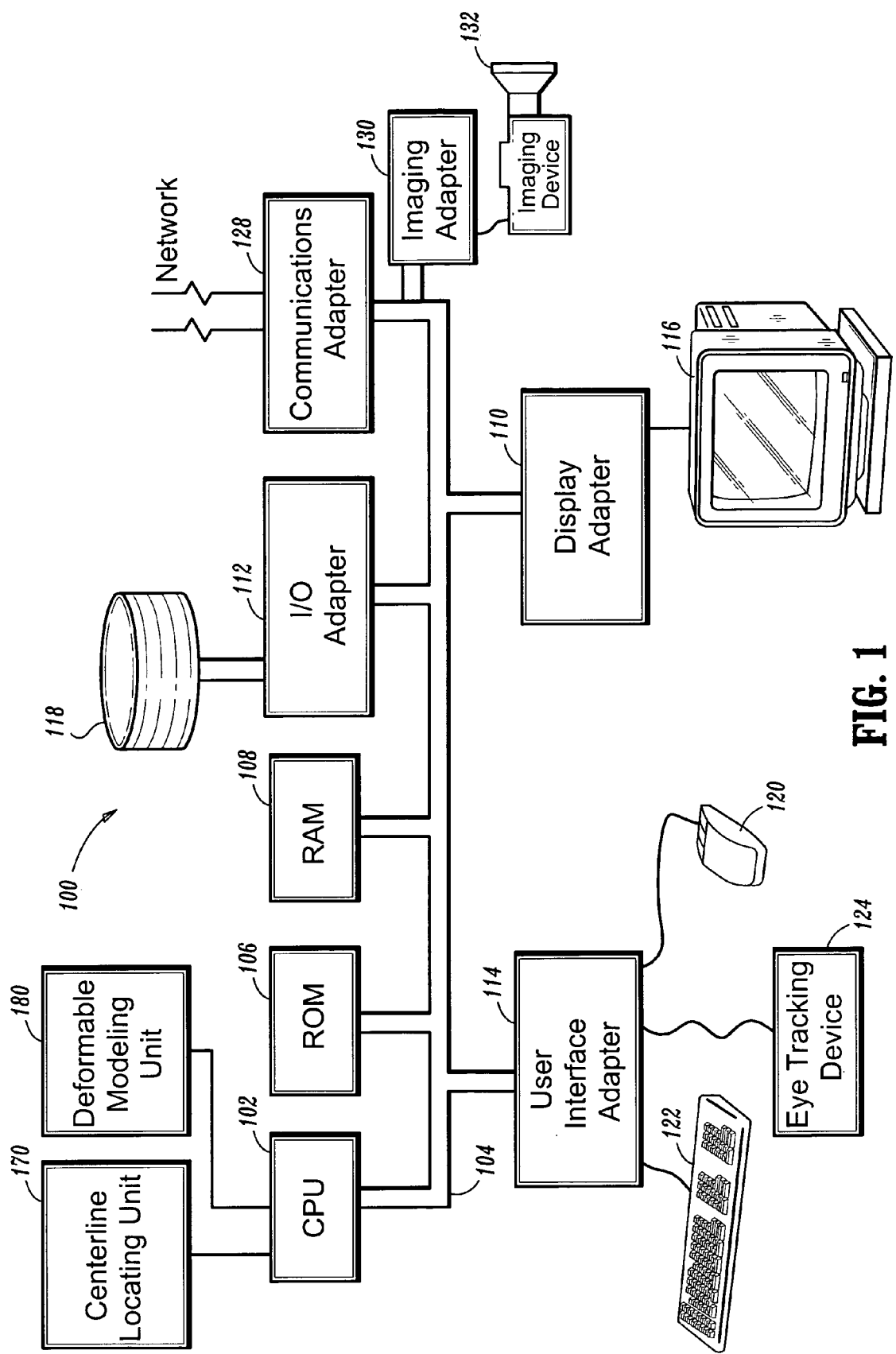
FIG. 1 shows a schematic diagram of a system for artery-vein separation and vessel modeling in accordance with an illustrative embodiment of the present disclosure.

As shown in FIG. 1, a system for artery-vein separation and vessel modeling, according to an illustrative embodiment of the present disclosure, is indicated generally by the reference numeral 100. The system 100 includes at least one processor or central processing unit ("CPU") 102 in signal communication with a system bus 104. A read only memory ("ROM") 106, a random access memory ("RAM") 108, a display adapter 110, an input/output ("I/O") adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A centerline locating unit 170 and a deformable modeling unit 180 are also included in the system 100 and in signal communication with the CPU 102 and the system bus 104. While the centerline locating unit 170 and the deformable modeling unit 180 are illustrated as coupled to the at least one processor or CPU 102, these components are preferably embodied in computer program code stored in at least one of the memories 106, 108 and 118, wherein the computer program code is executed by the CPU 102.

Figure 2:
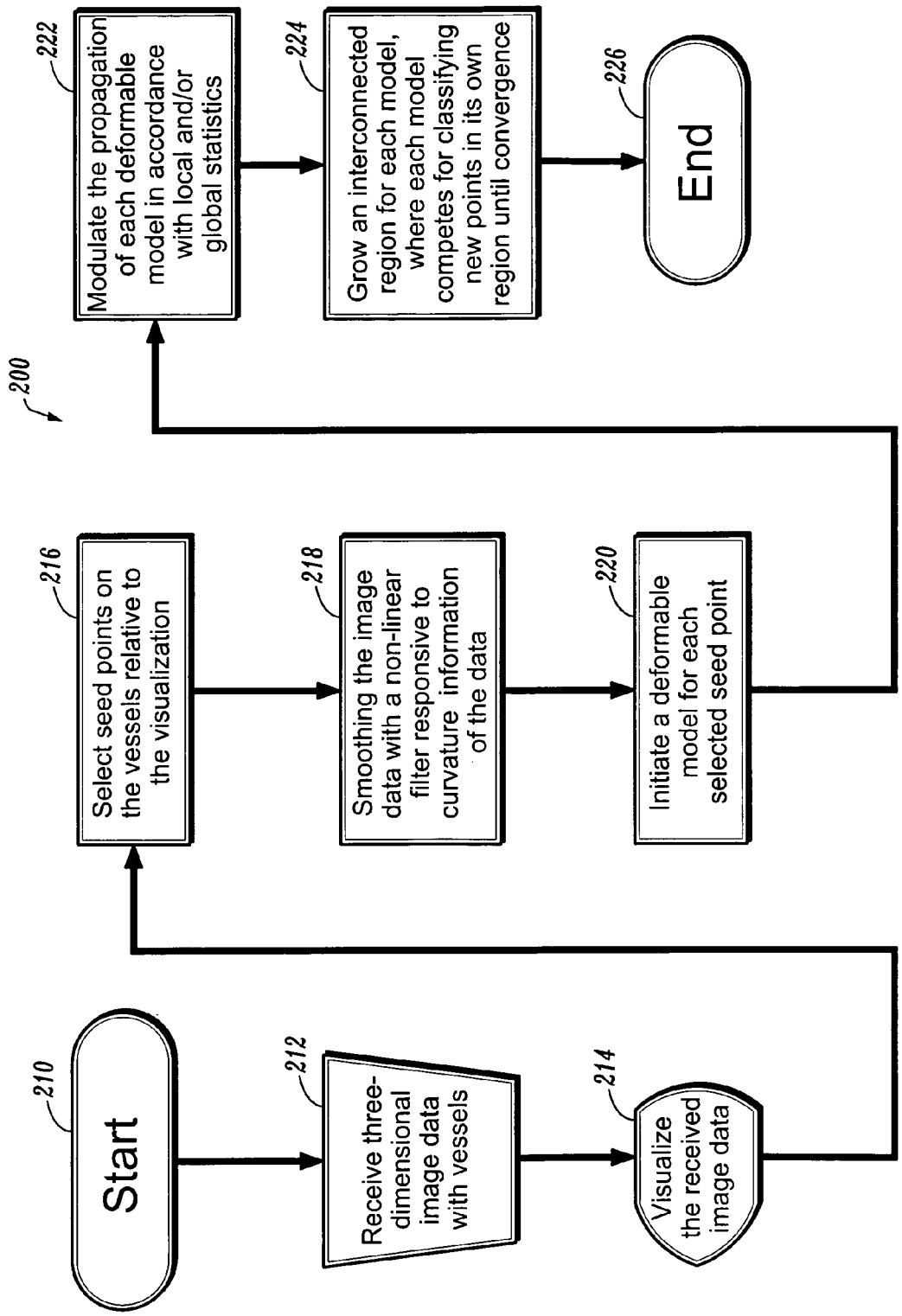
FIG. 2 shows a flow diagram of a method for artery-vein separation and vessel modeling in accordance with an illustrative embodiment of the present disclosure.

Turning to FIG. 2, a method for artery-vein separation and vessel modeling in accordance with an illustrative embodiment of the present disclosure is indicated generally by the reference numeral 200. The method 200 includes a start block 210 that passes control to an input block 212. The input block 212 receives scanned image data indicative of vessels, and passes control to a function block 214. The function block 214 visualizes the received image data, and passes control to a function block 216. The function block 216, in turn, selects seed points on the vessels relative to the visualization, and passes control to a function block 218. The function block 218 smoothes the image data with a non-linear filter responsive to curvature information of the data, and passes control to a function block 220. The function block 220 initiates a deformable model for each selected seed point, and passes control to a function block 222. The function block 222 modulates the propagation of each deformable model in accordance with local and/or global statistics, and passes control to a function block 224. The function block 224, in turn, grows an interconnected region for each model, where each model competes for classifying new points in its own region until convergence, and passes control to an end block 226.

Figure 3:
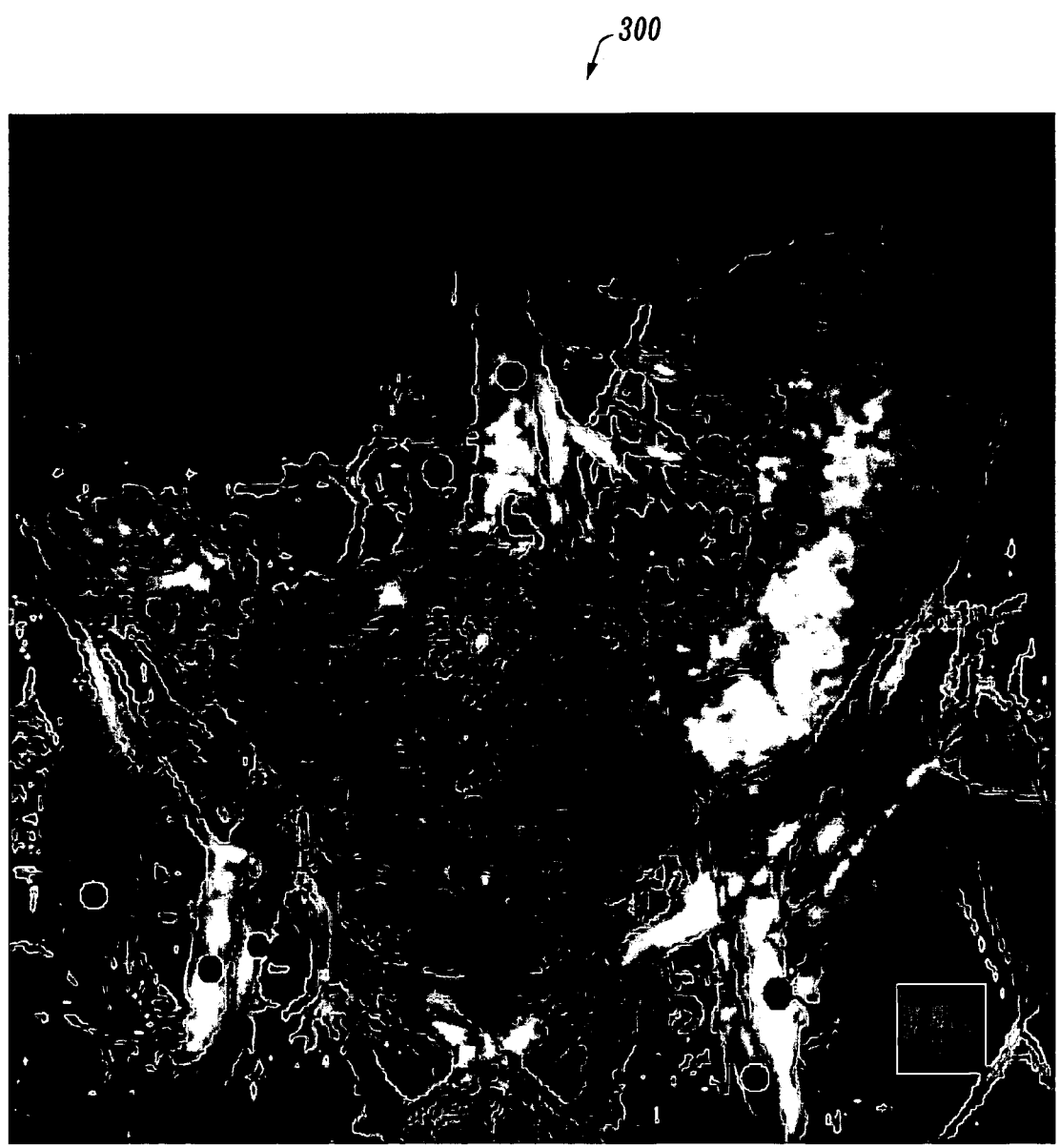
FIG. 3 shows a graphical diagram of seed placement in artery-vein separation and vessel modeling in accordance with an illustrative embodiment of the present disclosure.

Turning now to FIG. 3, a seed placement image is indicated generally by the reference numeral 300. The image 300 illustrates the seed placement for arteries and veins in volume rendering visualization ("VRT").

Figure 4:
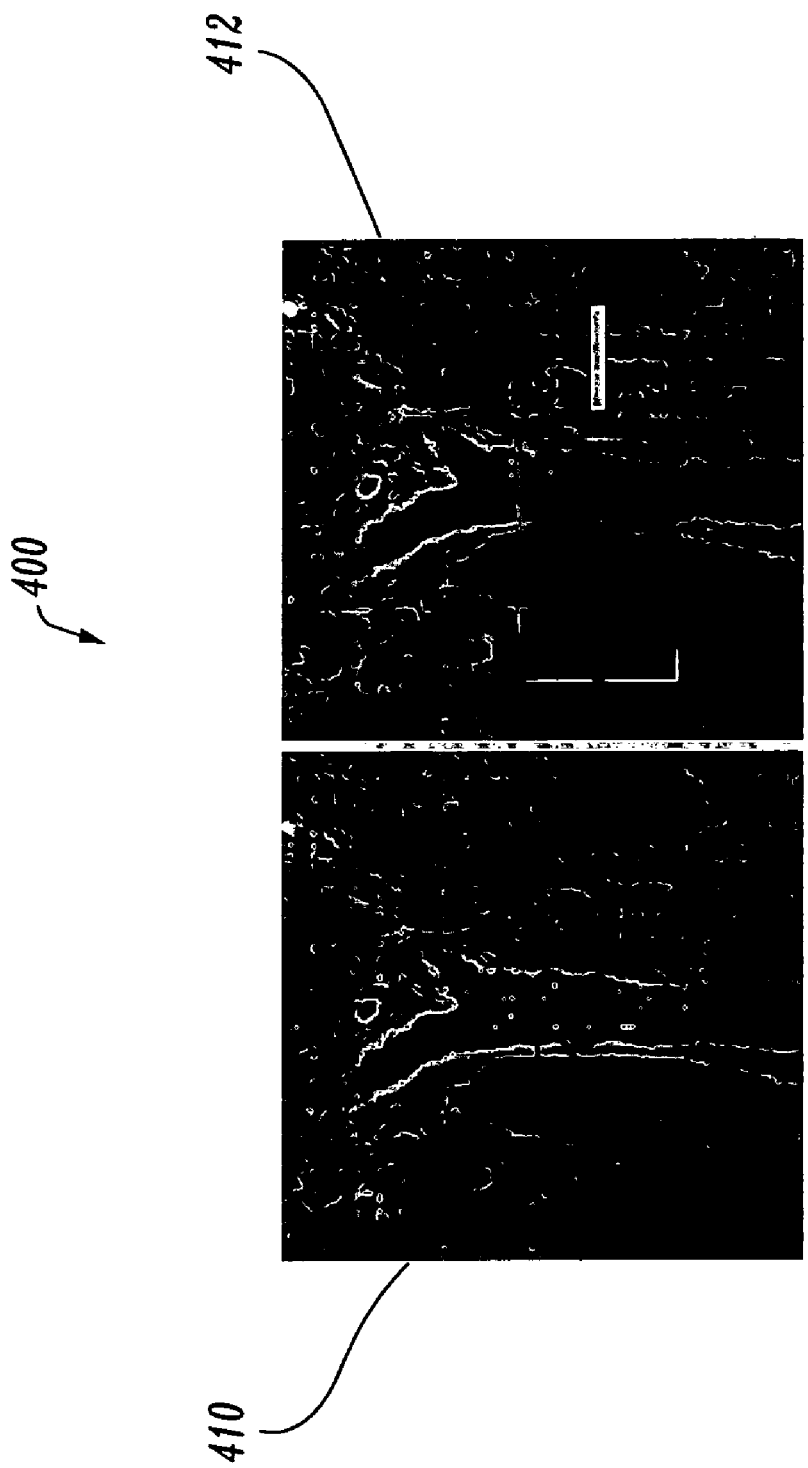
FIG. 4 shows a graphical diagram of local smoothing in artery-vein separation and vessel modeling in accordance with an illustrative embodiment of the present disclosure.

As shown in FIG. 4, local smoothing images are indicated generally by the reference numeral 400. The images 400 illustrate the local smoothing of CE-MRA data. Here, the noise is removed from the data in the first image 410 without adversely affecting the vessel boundaries in the second image 412.

Figure 5:
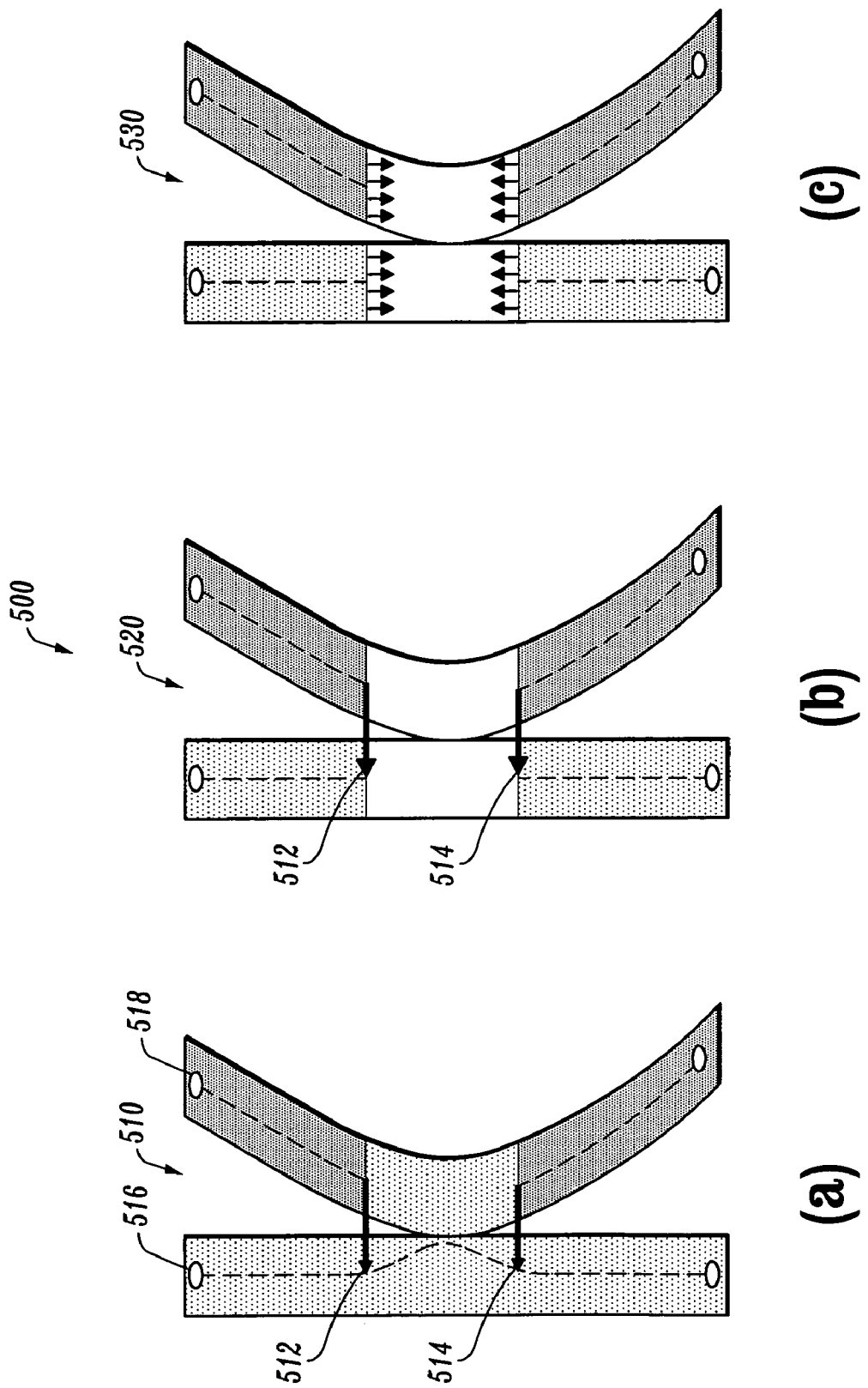
FIG. 5 shows a schematic diagram of error correction in artery-vein separation and vessel modeling in accordance with an illustrative embodiment of the present disclosure.

Turning to FIG. 5, error correction stages for a vessel pair is indicated generally by the reference numeral 500. In a first stage 510, an erroneous segmentation is determined by the end points 512 and 514 of broken centerline models 516 and 518. In a second stage 520, the segmentation results in the areas between the points 512 and 514 are deleted. In a third stage 530, new deformable models are initialized from the boundaries of the deleted areas.

Figure 6:
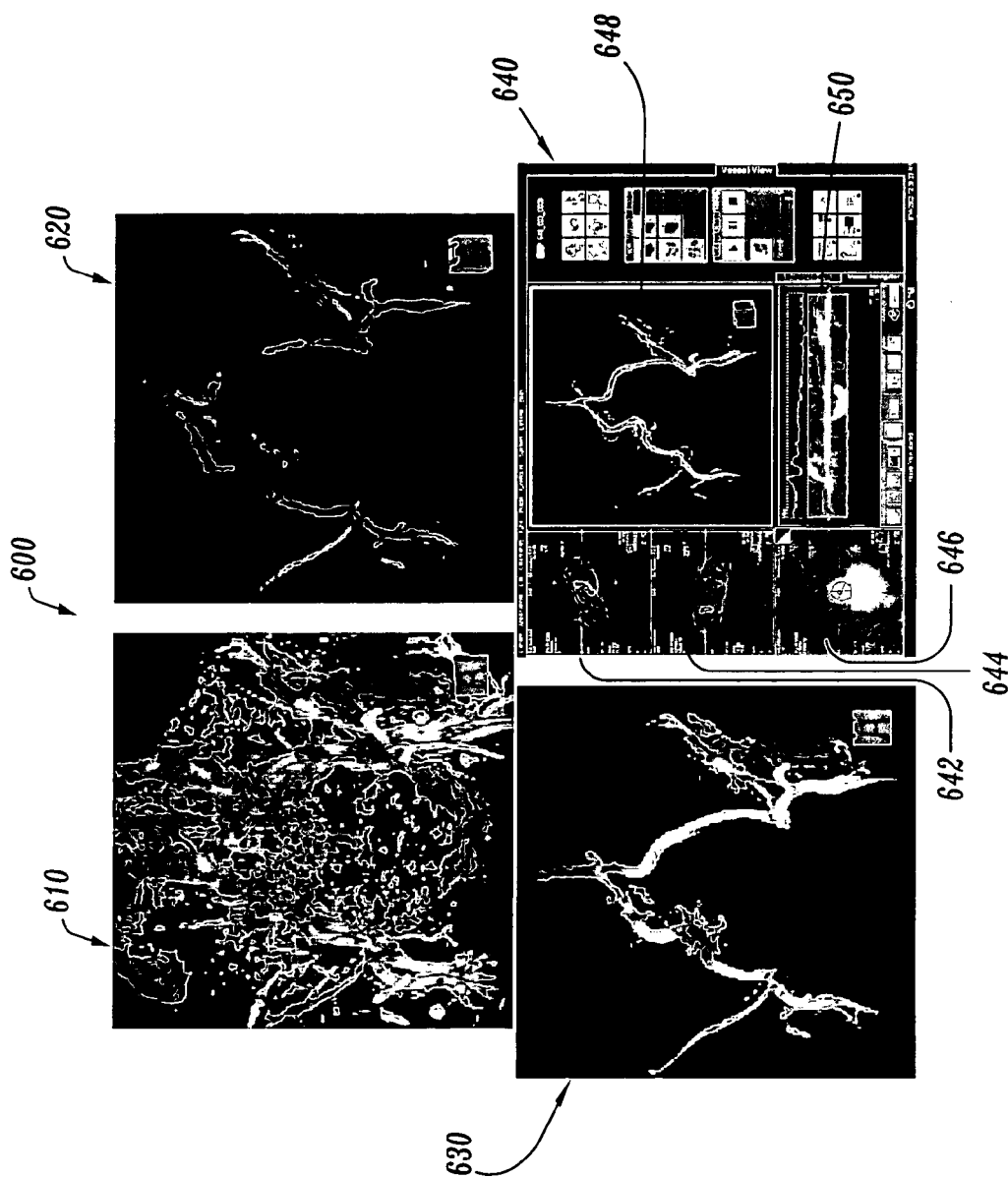
FIG. 6 shows a graphical diagram of process and results in artery-vein separation and vessel modeling in accordance with an illustrative embodiment of the present disclosure.

Turning to FIG. 6, artery-vein data and separation results images are indicated generally by the reference numeral 600. Here, the image 610 shows the original CE-MRA data. The image 620 shows results from the separation algorithm. The image 630 shows arteries after venous suppressions. The image 640 shows a snapshot of an exemplary vessel analysis package, which illustrates the three MPRs 642, 644 and 646, volume rendering transform ("VRT") visualization 648 showing arteries after venous suppression and vessel centerline curve, and the flattened visualization 650 of the artery specified in the VRT by the centerline curve. Thus, FIG. 6 illustrates the successful segmentation and separation of arteries from veins. It shall be understood that is an option to remove the arterial structures from the visualization for better-analysis of venous structures. Once venous or arterial structures are removed, arteries or veins can be investigated in greater detail, such as by vessel viewing software, for example.

In operation of an exemplary semi-automatic segmentation and separation method, a user selects seed points on the arteries and veins by using Volume Rendering Transformation ("VRT") or Maximum Intensity Projection ("MIP") visualizations. The algorithm applies non-linear smoothing or filtering to the CE-MRA data by considering the data as a 4D surface, and smoothing by evolving the data based on its curvature information. This exemplary embodiment uses a Mean-Gaussian curvature, which removes noise but keeps vessel-like structures substantially unchanged.

Each seed point is used to initiate a deformable model where model growth is modulated by the local and global statistics. When deformable models from vessels such as veins and arteries collide during propagation, they compete with each other for classifying regions with their own label until convergence. One such region competition algorithm separates arteries from vessels, but can also produce errors. Specifically, deformable models representing veins or arteries can sometimes cross over other arteries or veins, and, when the gap between them is small, they may grow together until they collide with another artery or vein deformable model. This could happen since the algorithm does not require very complicated seed placements. These errors may be avoided if a large number of seeds for both arteries and veins are symmetrically placed away from each other.

Rather than using an advanced seed placement technique, embodiments of the present disclosure incorporate centerline models of vessels. Specifically, the centerlines between seed points are detected from the segmentation and separation results. The centerline between seeds may be constructed by using Dijkstra's algorithm, for example, where the cost function may be derived from the distance transform of the segmented vessels and the distance between seed points. Deformable models are then initialized from the centerlines for better separation of the arteries and veins.

These models grow based on local and global statistics, and compete with each other when they collide. The incorporation of centerline models significantly improves accuracy. If errors occur, the user can add or delete seeds to correct the results until satisfied. Since the computations are local in this algorithm, the computational burden of this correction stage is relatively low. In addition, for further computational efficiency, a local smoothing technique is provided where the smoothing is applied only at places where the deformable models visit.

In the exemplary artery-vein separation algorithm for CE-MRA, the algorithm is user friendly since the user only clicks on 3D visualization for placing seeds. The current implementation takes only about two minutes on a 1.5 GHz Pentium 3 machine, for example. This algorithm has been successfully tested on more than 20 abdominal CE-MRA data sets. In most cases, the algorithm performed successfully. When errors occurred in the results, the user easily corrected the results by adding more seeds without restarting the whole process. The correction process took no more than five minutes.

Another exemplary embodiment includes an algorithm for segmenting and separating arteries from veins in CE-MRA and CE Computed Tomography Angiography ("CTA") imaging. For example, both arteries and veins are significantly enhanced in the MRA data when the MS-325 contrast agent is used. This embodiment combines region based deformable models with vessel centerline models for the separation of arteries from veins in CE-MRA and CE-CTA. In a semi-automatic segmentation and separation algorithm, a user selects a few points on the arteries and veins by using VRT or MIP visualizations, for example.

The algorithm applies a non-linear smoothing filter to the CE data. This algorithm considers the data as a 4D surface and smoothes it by evolving it based on its curvature information.

Here, the curvature information may include a Mean-Gaussian curvature, which removes noise but keeps vessel-like structures unchanged.

A deformable model is initiated from each seed point, where model growth is modulated by the local and global statistics. When deformable models from vessels and arteries collide during the propagation, they compete with each other for classifying regions with their own label by using region-competition until convergence. Although errors may be avoided if a large number of seeds for both arteries and veins are symmetrically placed from each other, the present embodiment incorporates the centerline models of vessels instead of using such advanced seed placement techniques. Specifically, this algorithm detects the centerlines between seed points from the segmentation and separation results. The centerline between seeds is constructed by using Dijkstra's algorithm, as known in the art, where the cost function is derived from the distance transform of the segmented vessels and the distance between seeds.

Deformable models are initialized from the centerlines for better separation of arteries and veins. These models are grown based on the local and global statistics, and compete with each other when they collide. The incorporation of centerline models significantly improves the accuracy of region-growing. The user can add or delete seeds to fine-tune the results, if desired. Since the computations are local in this algorithm, the computational burden of the tuning stage is low. In addition, for further computational efficiency, a local smoothing technique is used where the smoothing is applied only at places where the deformable models visit.

Partial Differential Equation ("PDE") based smoothing of images may also be used. Vascular structures in CE-MRA or CE-CTA are often distorted by the presence of noise due to the image acquisition devices or partial volume effects. Thus, it is often necessary to apply a small amount of smoothing to the intensity data before the segmentation algorithms are applied in order to obtain robust segmentation results. Most current image smoothing algorithms are based on filtering an image with local operators. The most common image smoothing methods are based on filtering data with Gaussian operators. Unfortunately, there are two major shortcomings of Gaussian smoothing: (i) Gaussian smoothing shrinks shapes and dislocates boundaries when moving from finer to coarser scales. (ii) Gaussian smoothing blurs important image features Thus, embodiments of the present disclosure do not consider Gaussian smoothing, but use a PDE based nonlinear image-smoothing algorithm. The technique is attractive because it removes unwanted structures or noise without removing the boundaries of tubular structures. This algorithm is based on curvature-based smoothing. Specifically, grey-level images are used as an evolving surface based on curvature information. In 2D, the curvature or diffusion process pushes sharp protrusions in and brings out deep indentations quickly. Unfortunately, this allows gaps to be bridged. In 3D, a similar reasoning applies to convex and concave elliptic points of the 3D surface. However, the problem is confounded by the existence of parabolic and hyperbolic points.

Curvature-dependent deformations in 3D are appropriate for shape representation. Deformations that satisfy certain visual constraints will also satisfy the following choices for their direction of flow: (1) hyperbolic points should have zero velocity, (2) parabolic points should have zero velocity, (3) elliptic convex points should move in while elliptic concave points should move out. In addition to establishing a direction of flow, a monotonic condition for the magnitude of the flow shows that the square root of Gaussian curvature is suitable for the magnitude. The evolution equation is a function of the 4D intensity data. This type of evolution has been proposed for the analysis of movies, which are sequence of images in time, and for surfaces.

This description of curvature is suitable for applications where: convex protrusions in 3D push in, and 3D concave indentations pull out; cylindrical structures such as veins are not affected, and hyperbolic points do not move. The latter point is necessary if nearby vascular structures are to be preserved accurately while regularizing over difficult areas, such as weak gradient points. While this PDE based smoothing algorithm removes the noise without affecting vessel boundaries, it can be computationally expensive. Thus, preferred embodiments apply this smoothing only to areas where the segmentation algorithm operates, which results in the savings of significant amounts of computational time. Referring back to FIG. 4, this PDE based local smoothing algorithm is used on a CE-MRA data.

Exemplary embodiments of the present disclosure accomplish vessel segmentation by region competition. Region competition may be used for the simultaneous segmentation of arteries and veins. A user places seeds for arteries, veins and tissues surrounding vessels by using VRT or MPR visualization. Deformable models are initialized from seeds, which grow by image statistics. Deformable models of the same type, such as artery and artery, merge when they collide with each other. On the other hand, different types of deformable models, such as artery and vein, compete for region based on the statistics of the models.

Region competition that combines the geometrical features of deformable models and the statistical nature of region growing includes using a combination of statistical and smoothing forces for seed growth. It also introduces a local competition between regions when they contact each other, by trading pixels that result in a decrease of energy, thus allowing recovery from errors. Specifically, if seed regions or objects are found relative to one background region having a boundary, the intensity values in that region will be consistent with having been generated by a probability distribution with particular parameters. The local deformation at a point on the boundary of a region results from a smoothing force and a statistical force, where each of the curvature at the boundary of the region, the image at the point, and the normal to the boundary are known. As a result of competition between two adjacent regions, the local deformations of their boundary are based on a single smoothing term for the boundary and a competition between the two statistical forces, relative to a point on the common boundary and parameters of the probability distribution describing the regions.

A relationship exits for the gradient descent for minimizing description length ("MDL"), including a curvature term that represents Euclidean curve shortening flow. Region competition implements a back and forth competition between adjacent regions, which is continued to convergence. After convergence, two adjacent regions are merged if the merge leads to an energy decrease. In this case, the competition resumes and is continued until a final convergence resulting in the final segmentation.

Region competition is a powerful technique that works well in a wide variety of images, including diffused or weak edges between noisy regions. This method will benefit from improvement in at least two areas: (i) the lack of effectiveness of smoothing terms leading to jagged boundaries, and (ii) the effective similarity of speeds for statistically different regions. If seeds are placed asymmetrically with respect to boundaries, that is, if a seed is placed close to a boundary, and another seed is placed far away, it is possible for the first seed to leak through if the boundary is weak and represents similar regions. If the second seed were to arrive at roughly the same time, the region competition would have reversed the situation and pushed back the extending region. However, due to asymmetric initialization, the first seed has a chance to grow for some time, and loses its statistical characterization. Thus, the parameters specifying the intensity distribution of the seed, such as mean and variance if a Gaussian model is used, change sufficiently that it can embody a large number of pixels, as can the competing region. In this case, recovery would be prevented as region competition cannot push back the extruding region.

The region competition algorithm works well for segmenting and separating arteries and veins if the user places the seeds properly. However, it is not easy to know where to place seeds for accurate results. Thus, it is possible that the region competition can produce incorrect separation where arteries and veins come very close to each other. These errors are corrected by initializing new seeds automatically.

Corrections may be made using centerline models. An iterative algorithm automatically detects incorrect separation of arteries and veins, and corrects them by placing new seeds. The centerline models detect the errors in segmentation and separation. The algorithm makes use of the fact that each seed must be connected to at least one more seed via a centerline model. Often, this connection is broken due to errors in segmentation. When the connection is broken between two seed points, there must be at least two centerline models with two end points, as shown in FIG. 5a. The segmentation between these end points must be corrected.

The centerlines of segmented objects are computed as follows. Centerline models are the most intuitive representations for tubular structures such as vessels. Algorithm embodiments use a minimum cost path detection algorithm based on Dijkstra's method for detecting the centerlines of segmented vessels. The segmented vessels are first regularized with morphological operations. Then, a front is initialized from each seed point. These fronts propagate inside the already segmented vascular structures until all of the evolving fronts meet with each other. The cost function or speed function for each front voxel is computed from the distance transforms of segmented vessels and the distance between voxels. The cost function for a first voxel visited by second voxel is a function of the distance transform ("DT") of the segmented vessels and a measure of the unsigned distance between them. The DT value forces the front to propagate near the vessel centers. A similar algorithm may be used for finding paths in tubular structures, such as the colon. This minimum cost path detection algorithm results in a discrete path consisting of ordered discrete voxel locations.

Once the centerline models for arteries and veins are detected, the erroneous segmentation results are detected by the broken centerlines. For each end point, the corresponding centerline of the object is computed by the minimum distance criteria as shown in FIG. 5a. Then the segmentation results of both objects in these areas are deleted, as shown in FIG. 5b. To obtain the correct results, new deformable models are initialized from the boundary of deleted regions, as shown in FIG. 5c. This algorithm is repeated until the connectivity between seed points is established.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for artery-vein separation and vessel modeling wherein all of the following steps are performed by a computer, comprising:
   receiving three-dimensional image data indicative of vessels;
   visualizing the received image data;
   selecting seed points on the vessels from the visualization;
   smoothing the image data with a non-linear filter responsive to curvature information of the data;
   initiating a deformable model for each selected seed point;
   modulating the propagation of each deformable model in accordance with at least one of local and global statistics;
   growing an interconnected region for each model, where each model competes against a neighboring model for classifying new points in its own region until convergence;
   detecting a collision when a plurality of deformable models collide during propagation; and
   outputting an indication of artery or vein in accordance with the interconnected region for each model.

2. A method as defined in claim 1, the visualizing comprising at least one of volume rendering transform visualization and maximum intensity projection visualization.

3. A method as defined in claim 1, the smoothing comprising treating the data as a four-dimensional surface and evolving the data in accordance with its curvature information.

4. A method as defined in claim 1, the received image data comprising at least one of contrast enhanced magnetic resonance angiography data and contrast enhanced computed tomography angiography data.

5. A method as defined in claim 1, the curvature information comprising a Mean-Gaussian curvature that removes noise but keeps vessel-like structures substantially unchanged.

6. A method as defined in claim 1 wherein at least one type of deformable model represents an artery and at least one other type of deformable model represents a vein.

7. A method as defined in claim 1, further comprising:
detecting when a model of one type crosses over a model of another type; and
preventing the models of different types from growing together when the gap between them is small.

8. A method as defined in claim 1, further comprising:
at least one of segmenting and separating the received data; and
modeling vessel centerlines between pairs of seed points in response to the at least one of segmenting and separating.

9. A method as defined in claim 8 wherein the centerlines are constructed by using a cost function derived from at least one of a distance transform of the segmented vessels and a distance between seed points.

10. A method as defined in claim 8 wherein the deformable models are initialized from the centerlines for better separation of the models.

11. A method as defined in claim 8, further comprising:
detecting incongruence;
at least one of adding and deleting seed points to correct the incongruence; and
updating the model propagation using only local computations in response to the corrected incongruence.

12. A method as defined in claim 1, further comprising local smoothing where the smoothing is applied only at places where the deformable models visit.

13. A method as defined in claim 1, further comprising selecting a large number of seeds for both arteries and veins that are symmetrically disposed relative to one another.

14. A method as defined in claim 1, the smoothing comprising partial differential equation based smoothing of intensities in the image data.

15. A method as defined in claim 1 wherein the smoothing is non-linear.

16. A method as defined in claim 1 wherein the smoothing is applied to the intensity data before a segmentation algorithm is applied to promote robust segmentation results.

17. A method as defined in claim 1, the smoothing comprising using grey-level images as an evolving surface based on curvature information.

18. A method as defined in claim 1, the smoothing comprising pushing sharp or convex protrusions in and bringing out deep or concave indentations.

19. A method as defined in claim 1 wherein the direction of smoothing flow is responsive to the following constraints:
hyperbolic points are not moved;
parabolic points are not moved;
elliptic convex points are moved inwards; and
elliptic concave points are moved outwards.

20. A method as defined in claim 1 wherein the smoothing is only applied to areas where the segmentation algorithm operates.

21. A method as defined in claim 1, further comprising:
introducing a local competition between regions of different types when they contact each other; and
trading pixels between the regions that result in a decrease of energy.

22. A method as defined in claim 1, further comprising:
merging two adjacent regions of the same type after initial convergence if the image leads to an energy decrease; and
resuming the region growing competition until a final convergence results in a final segmentation.

23. A method as defined in claim 1, further comprising:
defining a centerline model for each seed point;
iteratively detecting incorrect separation of region types; and
correcting the incorrect separation by automatically placing new seeds.

24. A method as defined in claim 23, further comprising using the centerline model for detecting an error in at least one of segmentation and separation of the image data.

25. A method as defined in claim 1, further comprising defining a centerline model by:
segmenting vascular structures in the image data;
regularizing the segmented vessels with morphological operations;
initializing a front from each seed point;
propagating the fronts inside the already segmented vascular structures until all of the evolving fronts meet with each other; and
using a minimum cost path detection algorithm for detecting the centerlines of segmented vessels.

26. A method as defined in claim 25 wherein the cost function for each of a plurality of front voxels is computed from the distance transforms of segmented vessels and the distance between voxels.

27. A method as defined in claim 25 wherein the cost function for a first voxel visited by a second voxel is a function of a distance transform of the segmented vessels and a measure of the unsigned distance between them.

28. A system for artery-vein separation and vessel modeling comprising:
an adapter unit for receiving three-dimensional image data;
a centerline locating unit in signal communication with the adapter unit for visualizing the received image data, selecting seed points on the vessels from the visualization, and smoothing the image data with a non-linear filter responsive to curvature information of the data;
a deformable modeling unit in signal communication with the centerline locating unit for initiating a deformable model for each selected seed point, modulating the propagation of each deformable model in accordance with at least one of local and global statistics, and growing an interconnected region for each model, where each model competes against a neighboring model for classifying new points in its own region until convergence; and
a display unit for outputting the interconnected region for each model,
wherein the interconnected region for each model represents one of artery or vein.

29. A system for artery-vein separation and vessel modeling comprising:
adapter means for receiving three-dimensional image data indicative of vessels;
display means in signal communication with the adapter means for visualizing the received image data;
interface means in signal communication with the display means for selecting seed points on the vessels from the visualization;
filter means in signal communication with the interface means for smoothing the image data with a non-linear filter responsive to curvature information of the data;

model means in signal communication with the filtering means for initiating a deformable model for each selected seed point;

modulator means in signal communication with the model means for modulating the propagation of each deformable model in accordance with at least one of local and global statistics; and region growth means in signal communication with the modulator means for growing an interconnected region for each model, where each model competes against a neighboring model for classifying new points in its own region until convergence, wherein the display means is disposed for outputting the interconnected region for each model, which represents one of artery or vein.

30. A computer-readable medium readable by machine, tangibly embodying a program of instructions executable by the machine to perform program steps for artery-vein separation and vessel modeling, the program steps comprising:

receiving three-dimensional image data indicative of vessels;

visualizing the received image data;

selecting seed points on the vessels from the visualization;

smoothing the image data with a non-linear filter responsive to curvature information of the data;

initiating a deformable model for each selected seed point;

modulating the propagation of each deformable model in accordance with at least one of local and global statistics;

growing an interconnected region for each model, where each model competes against a neighboring model for classifying new points in its own region until convergence; and outputting the interconnected region for each model, wherein the interconnected region for each model represents one of artery or vein.

* * * * *